April 25, 1961  C. P. SALMON ET AL  2,981,476
THERMOSTATICALLY CONTROLLED COILED SPRING VALVE
Filed May 28, 1957
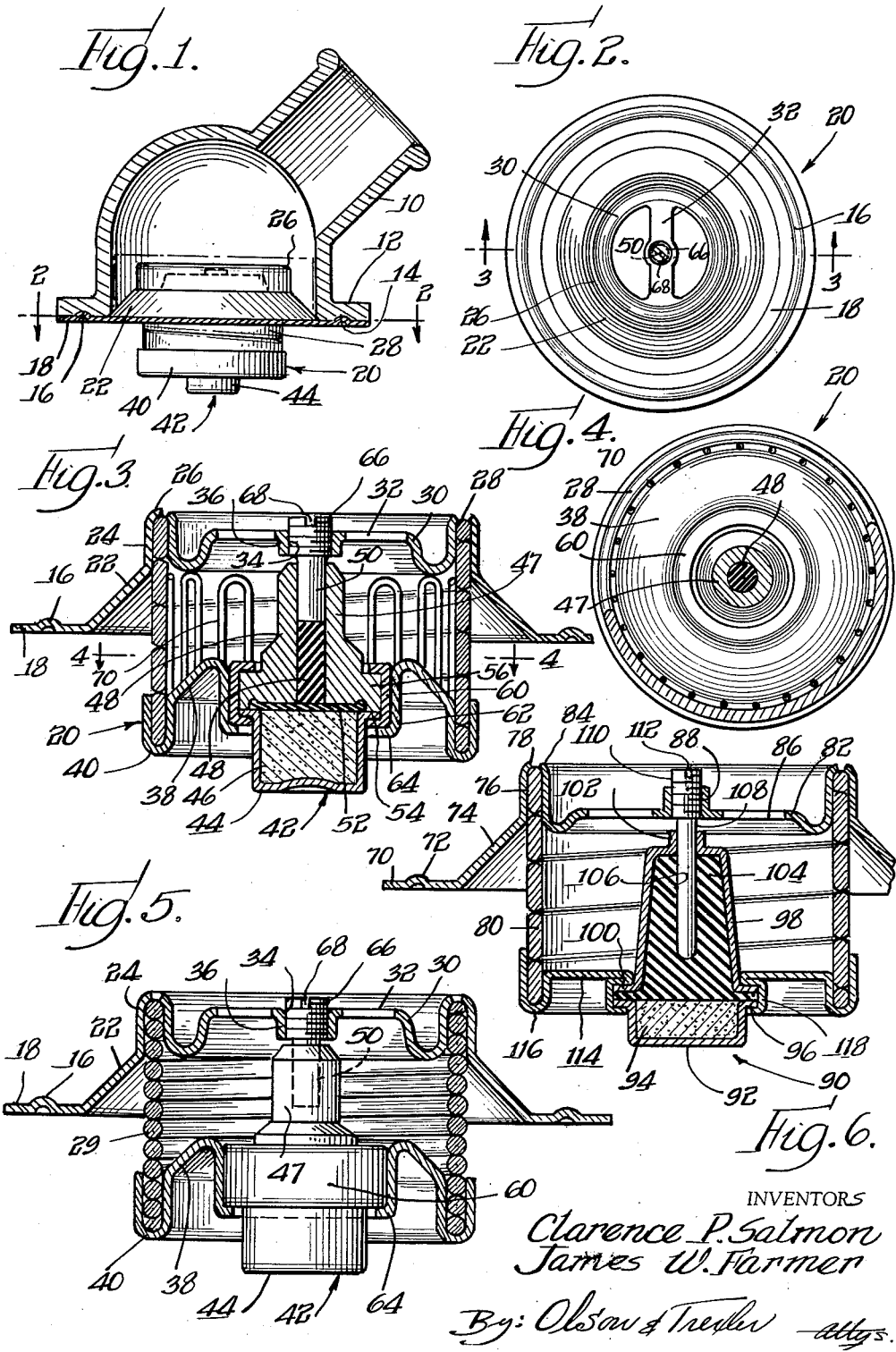
INVENTORS
Clarence P. Salmon
James W. Farmer
By: Olson & Trexler  Attys.

United States Patent Office 2,981,476
Patented Apr. 25, 1961

2,981,476
THERMOSTATICALLY CONTROLLED COILED SPRING VALVE

Clarence P. Salmon and James W. Farmer, Elgin, Ill., assignors to Flexonics Corporation, Maywood, Ill., a corporation of Illinois Filed May 28, 1957, Ser. No. 662,086

1 Claim. (Cl. 236—34)

This invention relates to a valve and specifically to a thermostatically controlled valve suitable for use in the cooling system of an automobile engine.

The valve of the present invention includes a temperature responsive power generating element comprising a material which is "morphologically transformable," as defined in the patent to Vernet No. 2,115,501, upon temperature change. Such a material may be an organic material which expands upon fusion, for instance, more or less crystalline hydrocarbon waxes obtained from petroleum, other paraffins, beeswax, para dichlorobenzene, para dibrombenzene, cyclohexane, diphenyl, and the like. The power generating element further comprises a cup-like housing receiving the morphologically transformable material which is confined within the cup or housing by a flexible member, such as a diaphragm, functioning as a closure for the cup or housing.

Upon expansion of the morphologically transformable material due to temperature rise, the expanding material moves a piston disposed so as to be directly or indirectly actuated by such expansion of the morphologically transformable material.

Temperature responsive power generating elements of the type described in the preceding paragraph must be kept under compression, for the reason that, upon cooling after expansion due to temperature rise, force must be exerted to return the element to its original condition. The force required for this purpose may amount to fifty pounds per square inch or more. Ordinarily a spring compressed upon expansion of the morphologically transformable material furnishes the compressive force to return the element to its original condition.

Temperature responsive power generating elements of the type described in the two preceding paragraphs are conventional and are available commercially. Examples of such elements are described in the patent to McKee No. 1,884,794; in the patents to Vernet, Nos. 2,115,501, 2,115,502, 2,259,846, 2,368,181 and 2,636,776; and the patent to Mayo No. 2,786,633.

In the valve of the present invention, a coiled spring is provided which functions both to compress the temperature responsive power generating element and as the valve element proper. Thus the coiled spring performs a multiplicity of functions.

Other and further features of the present invention will become apparent from the following description and appended claim as illustrated by the accompanying drawings which show, by way of examples, valves according to the present invention and in which:

Figure 1 is a partial central vertical cross-sectional view, with parts shown in elevation, of a conduit for an automobile engine cooling system incorporating a valve according to the present invention;

Figure 2 is a plan view taken along the line 2—2 showing the top of the valve incorporated with the conduit of Fig. 1;

Figure 3 is a cross-sectional view taken along the line 3—3 of Fig. 2, parts being shown in elevation;

Figure 4 is a cross-sectional view taken along the line 4—4 of Fig. 3;

Figure 5 is a view similar to Figure 3 but shows a valve of somewhat different construction; and Figure 6 is a view similar to Figure 3 but shows a valve of still another construction.

Referring now to Figure 1, the numeral 10 designates a conduit leading to an automobile radiator from a water jacket (not shown) of an automobile engine. This conduit 10 is provided with a horizontal flange 12 having a circular groove 14 receiving a circular bead 16 projecting upwardly from a generally flat, annular sheet metal member 18 forming a part of a valve indicated generally in Figures 1 to 4 by the reference numeral 20. The groove 14 and bead 16 serve to locate the valve 20 with respect to the conduit 10. The valve 20 may be held in place by clamping the annulus 18 between the flange 12 and the wall of the above mentioned water jacket around an aperture (not shown) in said water jacket.

The annulus 18 of the valve 20 is continued radially inwardly by an upwardly projecting funnel-shaped member 22 integral with the annulus 18. The member 22 is provided with a vertical cylindrical flange 24 having a free upper margin 26 turned radially inwardly to provide a seat for the uppermost convolution of a coiled spring 28 made up of metal strip or wire having a generally rectangular cross-sectional shape with rounded corners. The uppermost convolution of the spring 28 may be attached to the inside of a flange 24 by any suitable methods, as by soldering or spotwelding. Another annulus 30 of inverted U-shaped cross-sectional configuration has its outer leg abutting against the inside of the uppermost convolution of the spring 28 and, if desired, may be attached thereto by any suitable methods, as by soldering or spotwelding. As shown, the outer leg of the annulus 30 is somewhat longer than the inner leg thereof. A strap 32 having a central aperture 34 extends diametrically across the valve outlet opening defined by the annulus 30. The aperture 34 is surrounded by a depending flange 36 which is threaded on its inside.

The valve 20 further includes a generally funnel-shaped sheet metal member 38 having its outer margin formed into a deep depending bead 40 forming a clamping seat for the lower end of the coil spring 28. The inner margin of the funnel-shaped member 38 serves, in a manner described hereinbelow, to hold a temperature-responsive, pellet type power generating thermostat generally indicated at 42. As best shown in Fig. 3, the thermostat 42 is constructed as disclosed in the United States patent to Vernet No. 2,368,181 (to which reference is made for a detailed description) including a lower cup-shaped container 44 holding a plastic thermally expanding material 46 of a composition such as that disclosed in the United States patent to Vernet, No. 2,259,846, an upper tubular element 47, a rubber plug 48 in a bottom part of the bore of the tubular element 47, a piston 50 in the top part of the bore of the tubular element 47, and a diaphragm 52 separating the thermally expanding material 46 from the plastic plug 48. Further, the container 44 is formed with an upper flange 54 and the tubular element 47 with a lower flange 56 between which the margin of the diaphragm 52 is clamped, the two flanges being held together by a ring 60 of U-shaped cross-sectional configuration. As disclosed in the patent to Vernet, No. 2,368,181, a thermostat of such construction requires external pressure to compress the thermostat to its original condition after it has been expanded, since it has an inherent resistance to contraction in volume on temperature decrease.

As also shown in Fig. 3, the inner margin of the funnel-shaped member 38 is formed with a depending flange 62 having its rim bent over inwardly, as indicated at 64, to underlie the bottom of the ring 60 around the thermostat 42. Thus, the thermostat 42 is firmly and tightly held in the central aperture of the funnel-shaped member 38, and the member 38 and the thermostat 42 together form a closure for the lower end of the coiled spring 28 against fluid flow into this end of the coiled spring.

At its upper end, the piston 50 of the thermostat 42 is provided with an expanded head 66 which is exteriorly threaded to engage the screw threads on the inside of the aperture 34. Further, the head 66 is formed with a slot 68 to receive a screwdriver or the like.

A spring 70 extends arcuately inside the coiled spring 28 in contact therewith. The spring 70 consists of a wire bent into sinusoidal shape in a single plane and thereafter compressed arcuately to fit inside the coiled spring 28, where the compression of the spring 70 tends to straighten out the spring so that the spring will exert pressure against the inside of the coiled spring 28.

Preferably the coiled spring 28 is so made that its convolutions, in the absence of any axially directed pressure, are closed.

The above described valve functions as follow: Ordinarily the coiled spring 28 is compressed so that no liquid will flow through the valve. However, the valve is readily permeable to air. This feature is of great importance in facilitating the filling of a water jacket of an automobile engine with water for the first time. The water jacket can be filled rapidly, for the air is not trapped but can readily escape between the convolutions of the spring 28. On the other hand, water cannot leak between the spring convolutions.

When the water temperature rises, the thermally expanding material 46 pushes upwardly against the plug 48 and thereby also against the piston 50. The annulus 30 and its strap 32 being fixed, and the terminal head 66 on the piston 50 being threaded into the threads of the aperture 34 in the strap 32, no upward movement of the piston 50 with respect to the strap 32 is possible. Therefore the thermostat 42 will move downwardly, carrying with it the funnel-shaped member 38, so that the convolutions of the spring 28 will be spread apart, permitting flow of liquid between the convolutions into the interior of the coil spring 28 and thence upwardly through the aperture defined by the annulus 30.

Sometimes, valves of the type indicated are subject to severe vibration in the first stages of the valve opening movement as evidenced by the fact that after valve opening movement has been initiated the rate of fluid flow through the valve is reduced rather than increased when fluid pressure is raised. This condition may prevail through a considerable period of the valve opening movement. Further, in part of this period of the valve opening movement, the vibration of the valve is of the harmonic type and gives rise to strong sonic vibrations which sometimes cause destruction of parts of the valve. But due to the action of the spring 70, no such vibrations will be set up in the valve of Figures 1 to 4, and flow of water will take place which is more or less proportional to the area of the openings provided between the convolutions of the spring 28.

Further, while a helically wound coil spring is shown made of wire of rectangular cross-sectional form, other types of coil springs may be used, for instance coils of spiral shape. The convolutions of the coil may be circular, elliptical, square, triangular or of other shape. The wire may be of rectangular, circular, elliptical, or other cross sectional shape. Reference is made to Figure 5 as showing a valve constructed identically with the valve of Figures 1 to 4 except for the provision of a coiled spring 29 of round cross-sectional shape in place of the coiled spring 28 of rectangular cross-sectional shape in the valve of Figures 1 through 4.

Figure 6 shows still another valve according to the present invention comprising an outer annulus 70 having a circular bead 72 and formed integrally with an inner funnel-shaped member 74 terminating in an upwardly projecting flange 76 having its upper margin deflected radially inwardly, as indicated at 78, to form a seat for the upper end of a coiled spring 80 having a wire of generally rectangular cross-sectional form. An inner annular member 82 of U-shaped cross sectional form has its outer leg (which is longer than its inner leg) deflected outwardly at its margin, as shown at 84, to about the inside of the top of the coiled spring 80. A strap 86 bridges the aperture defined by the annular member 82. At its center, the strap 86 is formed with an interiorly threaded aperture 88.

A thermally responsive power generating element is generally indicated at 90 and comprises a cup-like housing 92 filled with a morphologically transformable material such as beeswax 94. The upper margin of the cup 92 is deflected outwardly to define a flange 96. An upwardly tapering or conical hollow sheet metal member 98 has its lower margin deflected outwardly to define a flange 100 overlying the flange 96. At its upper end, the member 98 is formed with a restricted cylindrical portion 102. A generally conical resilient member 104 made of rubber fills the interior of the member 98, being seated on top of the wax 94. The member 104 is formed with an axial upwardly open cavity 106 in which is seated a piston 108 having an upper terminal head 110 slotted at 112 and exteriorly threaded to engage the threads of the aperture 88 in the strap 86. The piston 108 fits slidingly within the restricted cylinder 102 which serves as a guide for the piston.

An annular sheet metal member 114 has its outer margin formed into a deep bead 116 receiving and holding the lower end of the coiled spring 80. The inner margin of the member 114 is folded around the two superposed flanges 96 and 100, as indicated at 118, to hold these two flanges tightly in assembled relationship. Thus, the member 114 and the housing 92 close the lower end of the coiled spring 80.

The valve of Figure 6, functions similarly to the valve of Figures 1 to 4. On temperature rise, the expansion of the wax 94 moves the element 90 downwardly, the piston 108 being fixed with respect to the members 82 and 72, and the member 114 moves with the element 90, thus spreading apart the convolutions of the spring 80. Liquid will then flow through the spring 80 for discharge through the aperture defined by the annular member 82. On temperature decrease, the spring 80 will resume its original position, the piston 108 being forced down into the cavity 106 and the wax 94 being compressed.

The above disclosed valves are particularly suitable for use to control automatically the cooling systems of internal combustion engines, particularly in automobiles, as explained hereinbelow.

The coolant flow requirements of an automobile engine cooling system have become more exacting with the use of engines of greatly increased horsepower provided with cooling systems operating at superatmospheric pressures for increased heat dissipation. In such systems, it is important that leakage through the thermostat valve shall be reduced to an absolute minimum to facilitate rapid warm-up of the engine to increase its efficiency. When fully open at high temperatures, the thermostat valve shall permit maximum flow therethrough to effect maximum cooling efficiency for a given size cooling system. These characteristics should not be altered by changes in engine speed with resultant changes in pump pressure and/or variations in system pressure. Further, the temperature range between minimum or no flow and maximum flow should be as narrow as possible.

The valve of the present invention meets the above requirements. When the valve is closed, there is practically no leakage of water therethrough (less than 0.01 gallon per minute under standard operating conditions). When fully open, the valve permits flow therethrough of large volumes of water. A narrow temperature range suffices to actuate the valve from closed to fully open position. These characteristics are not altered by changes in engine speed.

The valve of the present invention is self cleaning with respect to particles of dirt and the like which may lodge on the sealing surfaces of the coiled spring. There is only one moving part, with resultant improved accuracy and sensitivity due to the elimination of frictional drag and slop which are unavoidable in linkages, hinges, shafts, pivots, levers and like multiplying actions.

It will be noted that the actuating means of the valve of the present invention is disposed within the valve body. No glands or sleeves in valve body apertures are required to accommodate any valve actuating means.

Many details may be varied without departing from the principles of this invention and it is therefore not my intention to limit the patent granted on this invention otherwise than necessitated by the scope of the appended claim.

The invention is claimed as follows:

A valve comprising a one-piece solid wire in the form of a coiled spring arranged in cylindrical form with contiguous convolutions normally contacting one another to close the valve but separable to permit fluid flow therebetween, inner and outer annular members having inner and outer cylindrical wall portions spaced apart a distance equal to the thickness of the spring convolutions and providing a first channel with the free ends of the wall portion turned toward one another to provide a seat for the end of the coiled spring with adjacent end convolutions of the coiled spring secured in said first channel, said inner annular member being apertured interiorly of said first channel to permit flow of fluid to the interior of the coiled spring, a closure member of generally annular form having a relatively deep peripheral channel facing said first channel and having secured therein end convolutions at the other end of the coiled spring, said closure member having an annular central seating portion, said annular members as a unit and said closure member being relatively movable with respect to each other, and a temperature responsive mechanism carried by said seating portion with the opposite end thereof connected to said inner annular member and operable upon expansion thereof to relatively shift apart said annular members as a unit and said closure member to separate the spring convolutions and permit the passage of fluid therebetween.

References Cited in the file of this patent
UNITED STATES PATENTS

| | | |
|---|---|---|
| 960,080 | Fay et al. | May 31, 1910 |
| 1,246,355 | Thomas | Nov. 13, 1917 |
| 2,040,435 | Griswold | May 12, 1936 |
| 2,136,908 | Pierce | Nov. 15, 1938 |
| 2,265,586 | Vernet | Dec. 9, 1941 |
| 2,479,034 | Bolesky | Aug. 16, 1949 |
| 2,507,466 | De Craeme | May 9, 1950 |
| 2,578,958 | Winters | Dec. 18, 1951 |
| 2,636,776 | Vernet | Apr. 28, 1953 |
| 2,736,604 | Albright | Feb. 28, 1956 |
| 2,752,095 | Puster | June 26, 1956 |
| 2,777,638 | Wood | Jan. 15, 1957 |
| 2,797,873 | Woods | July 2, 1957 |
| 2,810,523 | Branson | Oct. 22, 1957 |
| 2,816,711 | Woods | Dec. 17, 1957 |
| 2,842,318 | Campbell | July 8, 1958 |